Jan. 24, 1956
R. O. FEHR ET AL
2,731,834
DYNAMIC BALANCING APPARATUS
Filed Aug. 19, 1952
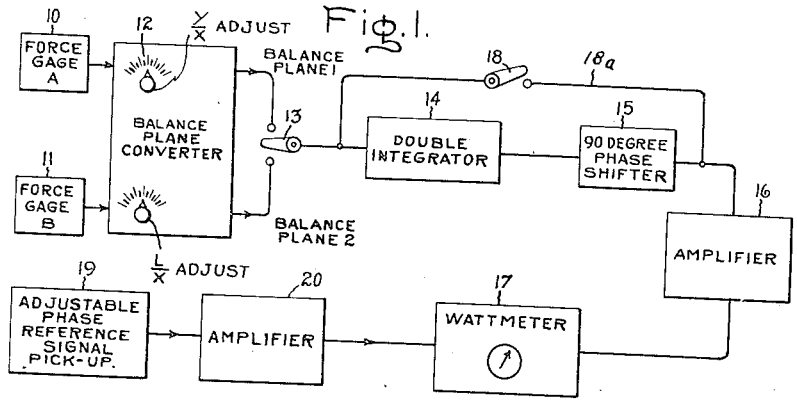
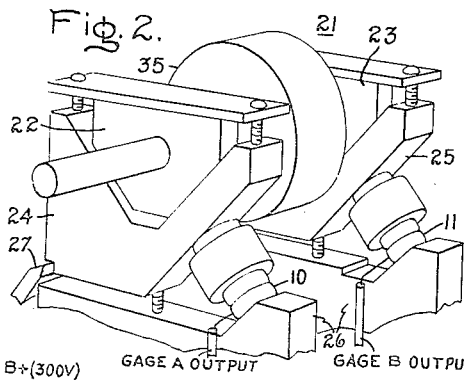
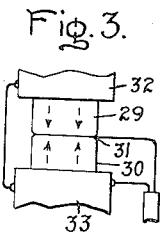
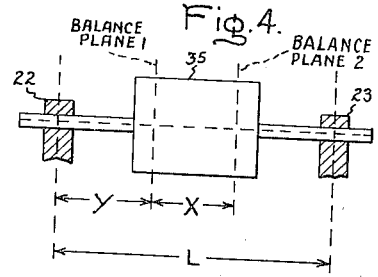
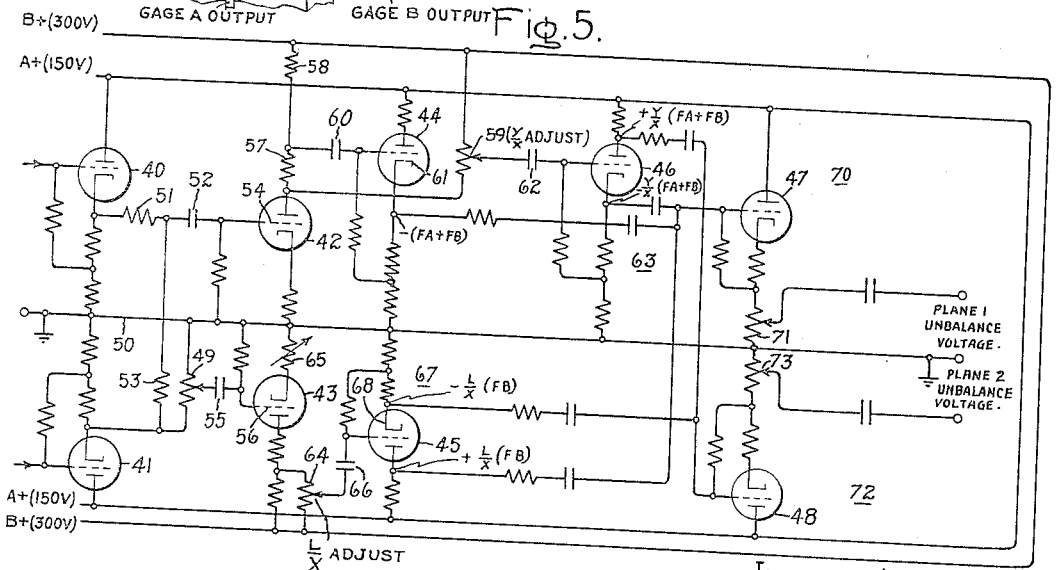
Inventors:
Robert O. Fehr,
Charles S. Duckwald,
Robert J. Ringlee,
Martin W. Hellar Jr.
by Paul A. Frank
Their Attorney.

United States Patent Office 2,731,834
Patented Jan. 24, 1956

2,731,834
DYNAMIC BALANCING APPARATUS

Robert O. Fehr and Charles S. Duckwald, Schenectady, N. Y., Robert J. Ringlee, Pittsfield, Mass., and Martin W. Hellar, Jr., Schenectady, N. Y., assignors to General Electric Company, a corporation of New York Application August 19, 1952, Serial No. 305,271

10 Claims. (Cl. 73—463)

The invention relates to apparatus for balancing a body destined to rotate about a predetermined axis of rotation in order to minimize rotational vibration of the body. Such apparatus has become known as "dynamic balancing apparatus."

One common type of dynamic balancing apparatus is a "flexible pedestal" machine in which the rotor to be balanced is mounted upon a flexible pedestal and rotated at a speed far above the first natural resonant rotational speed known as the "first critical speed" of the rotor and pedestal. Such "flexible pedestal" apparatus is designed to have a relatively low "first critical" speed, for example, below 5 cycles per second. At rotational speeds above the "first critical speed," the rotor turns as though the bearings provided negligible restraint and thus behaves as a free body which, of course, tends to rotate about an axis representing a stationary value of rotational kinetic energy. The resulting displacement of a principal rotor axis of inertia from the bearing center line is dependent in such flexible pedestal machines upon the amount and location of the unbalance mass on the rotor and also upon the mass and moment of inertia of the rotor. Velocity or displacement gages are employed to measure this displacement of a rotor principal axis of inertia from the bearing center line. Since different rotors usually have different masses and different moments of inertia, the flexible pedestal machine must therefore first be calibrated for each type of rotor to be balanced. This calibration is usually done by adding known unbalance weights to the rotor to be balanced and by observing the resulting change in displacement. The flexible pedestal machine has the advantage, however, that above the first critical speed of rotation, variations in speed of the rotor have substantially no effect upon the displacement of the rotor axis of inertia from the bearing center line.

There is a great need in industry, however, for a dynamic balancing apparatus in which there is no necessity to pre-calibrate the machine for each type of rotor to be tested, and which does not require pre-testing with balanced rotors and known unbalance weights in order to calibrate the machine. Accordingly, a principal object of the invention is to provide a dynamic balancing machine which does not require pre-test runs in order to calibrate the machine and which need not be recalibrated for different type rotors to be balanced.

For optimum correction of an unbalance condition of a rotor, balance weights must ordinarily be placed in at least two preselected spaced balancing planes of the rotor. With conventional balancing apparatus, the location of the mass and moment of inertia relative to each of these balancing planes must first be detected and calibrated by calibration runs with known unbalance weights individually attached in these balancing planes. This is especially true where the rotor to be balanced has a different diameter in each of the balancing planes. Accordingly, another object of the invention is to provide a balancing apparatus which does not require pre-calibration by pre-test runs before the detection of unbalance at any two arbitrarily preselected balancing planes of the rotor. An additional object of the invention is to provide dynamic balancing apparatus which may be employed during a single test run to detect the location and magnitude of an unbalance mass in each of two pre-selected balancing planes of a rotor to be tested.

In general, the invention comprises an improved "rigid pedestal" type balancing machine. In a rigid pedestal balancing machine, the entire system is designed to have a relatively high "first critical" speed, for example, over 200 cycles per second and the rotor to be balanced is rotated at speeds far below the first critical or natural resonant speed of the body and pedestal. The rotor is restrained from axial displacement by the rotor bearing. The rotor, therefore, rotates about an axis that is not coincident with a principal inertia axis, and the accelerating torques and forces act upon the restraining bearings. The bearing restraining forces may thus be employed in such rigid pedestal machines to measure the unbalance in the rotor. These unbalance forces exerted upon the rotor depend upon rotor speed and upon the amount and location of the unbalance mass, but do not depend upon the actual mass and moment of inertia of the test rotor. From a practical point of view, rigid pedestal-type balancing machines have heretofore found little general utility because the same difficulties of pre-calibration by the application of known unbalance weights have been present in such rigid pedestal-type machines. In addition, changes in rotor speed affect the unbalance readings. The present invention, however, makes use of the fact that a rigid pedestal-type machine directly measures the unbalance forces, and that this measurement is independent of the actual mass and moment of inertia of the test rotor.

In accord with the invention, means such as force gages included in the bearing supports of a rigid rotor pedestal, are provided for deriving two alternating voltages representing the unbalance force components acting in a given direction at two spaced points along the axis of a rotating body to be balanced. These two alternating voltages are converted by a novel balance plane conversion circuit into a third alternating voltage representing the unbalance force components acting in the same direction within two preselected balancing planes of the rotor lying in predetermined axially spaced relation to two axially spaced pick-up points (bearings) at which the unbalance-force-representing alternating voltages are derived. By simple adjustment of the electrical constants of this balance plane conversion circuit, two output signals are obtained representing the unbalance forces at any two arbitrarily preselected balancing planes of the rotor. Since the balance plane conversion circuit directly derives the unbalance force component attributable solely to each preselected balancing plane of the rotor, no pretesting or pre-calibration with known balancing weights is necessary for each type of rotor to be balanced. The voltages derived from the balance plane conversion circuit may be measured and this measurement directly calibrated in terms of mass eccentricity units to indicate the magnitude of the unbalance mass within the preselected balancing planes. The output voltage of the balance plane converter is preferably also passed through a double integrating circuit in order to convert this output voltage from a mass acceleration representing voltage into a mass-displacement (mass-radius) representing voltage, and thus to make this integrated unbalance-mass-representing voltage independent of changes in rotor speed. Means are preferably also provided for comparing the phase of the unbalance voltage derived from the balance plane converter with the phase of an alternating voltage representing a particular rotational position of the rotating body in order to determine the precise angular location of the unbalance mass within each balancing plane.

The novel features which are believed characteristic of the invention are set forth with particularity in the appended claims. The invention, however, together with further objects and advantages thereof may best be understood by reference to the following description taken in connection with the accompanying drawings in which Fig. 1 is a simplified block diagram of the electrical circuitry employed in a balancing machine embodying the invention; Fig. 2 is a perspective view of a rigid rotor pedestal and force gage apparatus; Fig. 3 is a detailed view of the force gages included in the rigid rotor pedestal of Fig. 2; Fig. 4 is a schematic diagram of the geometry involved in deriving the unbalance force at two predetermined balancing planes; and Fig. 5 is a schematic circuit diagram of the balance plane converter included in the block diagram of Fig. 1.

The general electrical system included in the balancing apparatus of the invention can be easily understood by referring to Fig. 1. In Fig. 1, blocks 10 and 11 represent two force gages A and B arranged to measure the bearing restraining force of two rigidly supported spaced bearings which journal a rotor to be balanced. The output voltage from each gage is a sinusoidally varying voltage whose instantaneous amplitude is a measure of the instantaneous magnitude of the unbalance force component acting upon the bearings in the planes of the force gages. These output voltages from gages A and B are supplied to a balancing plane converter 12 whose actual circuitry is described herein in connection with Fig. 5. Balance plane converter 12 transforms the force gage output voltages into two other voltages which represent the unbalance force attributable to the unbalance mass lying in each of two preselected balancing planes 1 and 2 of the rotor. The converter output voltage corresponding to either balancing plane 1 or 2 is then supplied through switch 13 to a double integrator 14. The double integrator 14 comprises two series-connected integrators of conventional well-known type, such as shown and described in section 8–9 of the book "Electron-Tube Circuits" by Seely (McGraw-Hill, 1950). The twice-integrated output voltage of integrator 14 is passed through a 90-degree phase shifter 15, amplified by an amplifier 16 and supplied to a measuring instrument such as to one input circuit of an electric wattmeter 17. A low impedance path 18a including a switch 18 is preferably connected to short-circuit double integrator 14 and phase shifter 15. The voltage supplied to wattmeter 17 with switch 18 closed thus represents the instantaneous unbalance mass-acceleration component at a pre-determined balancing plane 1 or 2 of the rotor, while the voltage supplied to wattmeter 17 with switch 18 open represents the instantaneous mass-displacement component of this balancing plane unbalance force. This mass-displacement component is, of course, independent of rotor speed and may be calibrated in terms of mass-radius units so as to have universal application to rotors of different weight and diameter.

Any alternating current measuring instrument may be substituted for wattmeter 17 in order to measure the amplitude of the unbalance mass. A wattmeter is preferably employed, however, because it filters unwanted frequency components of the unbalance signal and enables the angular position of the unbalance mass to be easily located. This is done by including in the balancing apparatus an electromechanical or photoelectric pick-up 19 arranged to derive from the rotating body an alternating voltage having the same frequency as the rotational frequency of the rotor to be balanced, and adjustably related in phase to a particular point on or radius of the rotating body. This adjustable-phase alternating voltage output of pick-up 19 is preferably amplified by amplifier 20 and delivered to the remaining input circuit of wattmeter 17. Pick-up unit 19 may, for example, be a tachometer generator having a rotatably positionable stator and a lightweight armature attached to rotate together with the rotating body to be balanced. Another suitable photoelectric-type adjustable phase pick-up unit is disclosed in U. S. Patent 2,405,430 granted to E. L. Kent on August 6, 1946.

During the balancing operation, the phase of the alternating voltage derived from pick-up unit 19 is varied with switch 18 closed until the wattmeter attains a predetermined minimum or 0 reading. At this null or minimum reading point, the phase of the angular position reference alternating voltage supplied to wattmeter 17 from pick-up unit 19 is exactly 90 degrees displaced from the phase of an alternating unbalance-force-representing voltage supplied to wattmeter 17 from balance plane converter 12. Since the phase of the angular position reference voltage is related to a particular point or radius of the rotor, the phase-adjusting means can be easily calibrated to indicate the angular position of the maximum unbalance mass in the selected balancing plane of the rotor. Switch 18 is then opened to connect integrator 14 and phase shifter 15 into the unbalance measuring circuit. The integrated unbalance voltage supplied to wattmeter 17 is then in phase with the angular position reference voltage, and the wattmeter indicates a value proportional to the actual unbalance mass times its radial displacement. The overall balancing system of Fig. 1 forms a portion of the subject matter described and claimed in U. S. patent application Serial No. 305,273 entitled "Dynamic Balancing Apparatus" filed concurrently herewith by M. W. Hellar and B. R. Shepard and assigned to the present assignee.

Referring now to Fig. 2, there is illustrated a suitable rigid pedestal-type force sensing unit 21. Unbalance force sensing unit 21 comprises a pair of spaced bearings 22 and 23 rigidly clamped within respective V-shaped supporting members 24 and 25 which in turn are rigidly supported on a massive pedestal 26 by means of one of a pair of knife edges 27 and force gages 10 and 11, respectively. Each knife edge and associated force gage is seated in a plane perpendicular to the bearing axis and displaced 90 degrees relative to each other. The support action of the knife edges is preferably along a line passing through the bearing axis while the supporting and force sending action of each force gage 10 and 11 is along a line perpendicular to line of knife edge support action and also passes through the bearing axis. In this way, each force gage 10, 11 measures the components of the unbalance force exerted by the rotating body in the radial direction along which the gages 10, 11 are located. Force gages 10 and 11 may be of any suitable electromechanical transducing type capable of rigidly restraining bearings 22 and 23 from movement. One preferred type of force gage, illustrated in Figs. 2 and 3, comprises a pair of piezoelectric barium titanate slabs 29 and 30 separated by a metallic electrode layer 31 and seated between projections 32 on each bearing support 24 and 25 and projections 33 on rigid pedestal 26. The weight of bearings 22 and 23 and bearing supports 24 and 25 together with an inserted rotor 35 is, of course, sufficient to firmly maintain the barium titanate slabs 29 and 30 in their proper position without further bonding or fastening means. Barium titanate slabs 29 and 30 have been previously polarized in accord with well-known techniques to exhibit piezoelectric effects. Each slab thus produces an electrical voltage between the common electrode 31 and its metallic supporting projection when subjected to a mechanical force in a direction perpendicular to the plane of common electrode 31. Each slab 29 and 30 is piezoelectrically polarized in an opposite direction relative to the common central electrode 31 such that the voltage produced between bearing projection 32 and common electrode 31 has the same polarity as the voltage produced between pedestal projection 33 and common electrode 31 when both barium titanate slabs 29 and 30 are compressed. By this arrangement projection 32 and projection 33 may both be grounded, and the voltage developed at central common electrode 31 employed as the output voltage from the force gage relative to a ground potential. Barium titanate slabs 29 and 31 are admirably suited for the piezoelectric element in the force gages 10 and 11 because of their high piezoelectric coefficient, mechanical strength, high dielectric constant, and stability.

Referring now to Figs. 4 and 5, there is shown a schematic circuit diagram of a suitable balance plane converter 12 and a schematic diagram of the geometrical parameters involved in presetting the balance plane converter. As mentioned above in connection with the block diagram of Fig. 1, balance plane converter 12 transforms the two input bearing unbalance force voltages sensed by force gages 10 and 11 into two output voltages which represent the unbalance forces at two arbitrarily preselected balancing planes of the rotor 35. This is done by electrically factoring into the voltage received from gages 10 and 11 the particular geometry of the unbalance force sensing unit 21. The three distances which must be known in order to preset balance plane converter 12 are illustrated in Fig. 4 as the distance L between the two unbalance force pick-up points, i. e., the distance between bearings 22 and 23 in the rigid pedestal sensing unit 21 of Fig. 2; the distance Y between one pick-up point (bearing 22) and an adjacent preselected balancing plane 1 of the rotor to be balanced; and the distance X between the two preselected balancing planes 1 and 2 of the rotor. These distances may be easily measured either before or after rotor 35 is inserted in the pedestal.

We have found that the unbalance forces $F_1$ and $F_2$ at balance planes 1 and 2 may be expressed in terms of the unbalance force sensed by gages 10 and 11 in accord with the following equations:

(I) $\quad F_1 = (FA + FB) + \frac{Y}{X}(FA + FB) - FB\left(\frac{L}{X}\right)$ (II) $\quad F_2 = FB\left(\frac{L}{X}\right) - \frac{Y}{X}(FA + FB)$ where FA is the unbalance force acting on bearing 22,
FB is the unbalance force acting on bearing 23, and
L, X, and Y are the distances described above in connection with Fig. 4.

The accuracy of these equations can be easily checked by assuming that the static and dynamic unbalance of the rotor can be expressed by two forces in any two selected balancing planes. The following equations can then be written to cover this system.

(III) $\quad FA + FB = F_1 + F_2$ (IV) $\quad F_1 Y + F_2(X + Y) - FBL = 0$

By solving Equations III and IV for $F_1$ and $F_2$ in terms of FA and FB, we arrive at the above Equations I and II for voltages representing the unbalance forces at the two selected balancing planes.

The electrical circuitry for deriving these two unbalance voltages at balancing planes 1 and 2 in terms of the output voltage of the force gages 10 and 11 and the geometry of the unbalance force pick-up unit can, of course, take many forms. One simple and convenient electric circuit for accomplishing this purpose is illustrated by the schematic circuit diagram of Fig. 5.

Referring to Fig. 5, the balance plane converter 12 is shown as comprising electron discharge devices 40 through 48 inclusive, and circuitry associated therewith. Discharge devices 40 and 41 receive the output voltages from force gages 10 and 11 respectively, and are connected in conventional cathode follower circuits to supply corresponding output voltages to the control electrodes of discharge devices 42 and 43, respectively. A potentiometer 49 connected between the cathode of discharge device 41 and a grounded terminal bus connection 50 is provided to enable the output of each gage to be adjusted to have the same sensitivity, and thus, to compensate for any difference in sensitivity between the two gages. A portion of the voltage developed at the cathode of discharge device 40 is coupled through resistor 51 and capacitor 52 to control electrode 54 of discharge device 42, and a portion of the voltage developed at the cathode of discharge device 41 is similarly coupled through resistor 53 and capacitor 52 to the control electrode 54 of discharge device 42. The ohmic value of resistor 53 is chosen to be such that the voltage applied to control electrode 54 represents a force proportional to the sum of the unbalance forces $FA + FB$ derived from force gages 10 and 11. The voltage at the cathode of discharge device 41 is also connected through the gage balancing potentiometer 49 and coupling capacitor 55 to the control electrode 56 of discharge device 43. The voltage at control electrode 56 thus represents the unbalance force derived solely from gage 11.

Discharge device 42 is connected in a conventional amplifier stage having two resistors 57 and 58 in its anode circuit. Resistor 57 has an ohmic value substantially greater than the ohmic value of resistor 58 such that the voltage variation at the anode of discharge device 42 is much larger than the voltage variation at the point of connection between resistors 57 and 58. Both voltages are reversed in phase from the voltage supplied to control electrode 54 and are, therefore, proportional to the negative sum of the forces $FA + FB$ acting upon both force gages 10 and 11. The voltage at the anode of discharge device 42 is applied across a potentiometer 59 which is adjusted in accord with the ratio between the distance Y from bearing 22 to preselected balance plane 1 and the distance X from balance plane 1 to balance 2. Potentiometer 59 may thus be termed the "Y/X adjustment." The voltage at the mid-connection between resistors 57 and 58 is coupled through capacitor 60 to the control electrode of discharge device 44 connected in a conventional cathode follower stage. The voltage at cathode 61 of device 44 is thus also proportional to the negative sum of the forces $FA + FB$.

The voltage at the adjustable tap of potentiometer 59 is coupled through capacitor 62 to the control electrode of discharge device 46 connected in a phase splitting amplifier stage 63. This phase splitting amplifier stage 63 is constructed to provide output voltages at its cathode and anode which are of identical amplitude but 180° out-of-phase. The Y/X adjust potentiometer 59 is calibrated such that for a Y/X ratio equal to 1, the voltage at the anode and cathode of discharge device 46 are both equal to the voltage at the cathode 61 of discharge device 44. Since the voltage at the cathode 61 is proportional to the sum of the forces acting upon gages 10 and 11, then the voltages derived at the anode and cathode of discharge device 46 are respectively proportional to the values plus and minus $Y/X(FA + FB)$, as indicated in Fig. 5.

Returning now to discharge device 43, the voltage supplied to its control electrode solely from the output of gage 11 is amplified by an amplification stage associated with discharge device 43 and applied across a potentiometer 64 connected in the output circuit of the stage. A variable resistor 65 is preferably also included in the cathode circuit of this stage in order to enable an amplification balance between stages associated with discharge devices 42 and 43. Potentiometer 64 is adjusted in accord with the ratio of the distance L between the bearings 22 and 23 and the distance X between the selected balancing planes 1 and 2. This potentiometer 64 may thus be called the "L/X adjustment" for the balance plane converter 12. The voltage at the movable tap of potentiometer 64 is coupled through capacitor 66 to the control electrode of discharge device 45 connected in a phase splitting amplifier stage 67 to provide an anode voltage representing the product of L/X(FB) and a cathode voltage representing $-L/X(FB)$. The L/X adjustment potentiometer 64 may be easily calibrated by setting the L/X potentiometer to 1 and by varying resistor 65 until signal voltage at cathode 68 of discharge device 45 is equal to the signal voltage at cathode 61 of discharge device 44 with gage 10 disconnected.

The cathode voltage of discharge device 44, the cathode voltage of discharge device 46, and the anode voltage of discharge device 45 are all coupled to the control electrode of discharge device 47 connected in an output cathode follower stage 70. The voltage developed across potentiometer 71 in the cathode circuit of the cathode follower stage associated with discharge device 47 with all signs reversed is thus proportional to the quantity $$\frac{Y}{X}(FA+FB)+(FA+FB)-FB\left(\frac{L}{X}\right)$$

This voltage represents the unbalance force at balance plane 1 as explained above in connection with Equation I.

The cathode voltage of discharge device 45 and the anode voltage of discharge device 46 are both coupled to the control electrode of discharge device 48 connected in a conventional cathode follower output stage 72 of the balance plane converter 12. The voltage developed across a potentiometer 73 in the cathode circuit of this cathode follower stage 72 with all signs reversed is thus proportional to the quantity $FB(L/X) - Y/X(FA+FB)$. This voltage represents the unbalance force at balance plane 2 as explained above in connection with Equation II. Potentiometers 71 and 73 may, of course, be calibrated to represent the unbalance forces at planes 1 and 2 in terms of any desired unbalance force units.

It will thus be seen that we have provided balancing apparatus capable of determining in a single test run the location and magnitude of the unbalance mass in two arbitrarily preselected balance planes of a rotor to be balanced. The balancing apparatus may be calibrated to give an accurate and immediate indication of these unbalance forces in terms of mass radius units without previous test runs with known unbalance weights applied to the rotor. Moreover, the apparatus is relatively simple to operate requiring only a few preliminary adjustments depending upon the geometry of the rotor to be balanced and that of the unbalance force sensing unit.

Although we have described above a specific embodiment of our invention, many modifications can be made, and it is to be understood that we intend to cover, by the appended claims, all such modifications as fall within the true spirit and scope of the invention.

What we claim as new and desire to secure by Letters Patent of the United States is:

1. Dynamic balancing apparatus comprising a pair of rigidly supported spaced bearings for journalling a body to be balanced; means including force gages connected to said bearings for developing two force gage output voltages proportional to the unbalance forces exerted upon said bearings by a journalled rotating body; an electric balance plane converter connected to receive said two force gage voltages for providing two output voltages proportional to the unbalance mass components existing within two preselected balancing planes of the body to be balanced; means in said electric balance plane converter for arbitrarily selecting said two balancing planes of the body to be balanced; said two output voltages being dependent on and varying with the output voltages of the force gages, the ratio of the distance between one bearing and an adjacent one of the preselected balancing planes to the distance between the two preselected balancing planes, and the ratio of the distance between the bearings to the distance between the two preselected balancing planes; and means for measuring either of said two balance plane converter output voltages.

2. In dynamic balancing apparatus comprising a pair of spaced bearings for journalling a rotating body to be balanced; means for providing two voltages FA and FB each representing the unbalance force exerted upon a respective bearing by a journalled rotating body; electric computing means for deriving from said two voltages FA and FB an output voltage proportional to the unbalance force component attributable solely to a first of two preselected balancing planes of a journalled rotating body, the electric computing means comprising means connected to receive said two voltages FA and FB for summing them to produce a voltage $(FA+FB)$, means connected to receive said voltage $(FA+FB)$ for producing a voltage $$\frac{Y}{X}(FA+FB)$$

where Y is the distance between said first balancing plane and the adjacent bearing and X is the distance between the two preselected balancing planes, means connected to receive said voltage FB for producing a voltage $$-FB\left(\frac{L}{X}\right)$$

where L is the distance between said bearings, and means connected to receive said voltages $$(FA+FB), \frac{Y}{X}(FA+FB)$$

and $$-FB\left(\frac{L}{X}\right)$$

for summing them to produce said output voltages.

3. In dynamic balancing apparatus comprising a pair of spaced bearings for journalling a rotating body to be balanced; means for providing two voltages FA and FB each representing the unbalance force exerted upon a respective bearing by a journalled rotating body; electric computing means for deriving from said two voltages an output voltage proportional to the unbalance force component attributable solely to a first of two preselected balancing planes of a journalled rotating body, the electric computing means comprising means connected to receive said two voltages FA and FB for summing them to produce a voltage $(FA+FB)$, means connected to receive said voltage $(FA+FB)$ for producing a voltage $$-\frac{Y}{X}(FA+FB)$$

where Y is the distance between the second balancing plane and the adjacent bearing and X is the distance between the two preselected balancing planes, means connected to receive said voltage FB for producing a voltage $$FB\left(\frac{L}{X}\right)$$

where L is the distance between said bearings, and means connected to receive said voltages $$-\frac{Y}{X}(FA+FB)$$

and $$FB\left(\frac{L}{X}\right)$$

for summing them to produce said output voltage.

4. In dynamic balancing apparatus comprising a pair of spaced bearings for journalling a rotating body to be balanced; means for providing two voltages FA and FB each representing the unbalance force exerted upon a respective bearing by a journalled rotating body; electric computing means for deriving from said two voltages FA and FB two output voltages proportional to the unbalance force components attributable solely to two preselected balancing planes of a journalled rotating body, the electric computing means comprising means connected to receive said voltages FA and FB for summing them to produce a voltage $(FA+FB)$, means connected to receive said voltage $(FA+FB)$ for producing voltages $$\frac{Y}{X}(FA+FB)$$

and $$-\frac{Y}{X}(FA+FB)$$

where Y is the distance between one bearing and the adjacent one of the preselected balancing planes and X is the distance between the preselected balancing planes, means connected to receive said voltage FB for producing voltages $$-FB\left(\frac{L}{X}\right)$$

and $$FB\left(\frac{L}{X}\right)$$

where L is the distance between said bearings, means connected to receive said voltages $(FA+FB)$, $$\frac{Y}{X}(FA+FB)$$

and $$-FB\left(\frac{L}{X}\right)$$

for summing them to produce one of said output voltages, and means connected to receive said voltages $$FB\left(\frac{L}{X}\right)$$

and $$-\frac{Y}{X}(FA+FB)$$

for summing them to produce the other said output voltage.

5. An electric balance plane converter for dynamic balancing apparatus for providing an output voltage proportional to the unbalance mass component existing within in a first of two preselected balancing planes of a body to be balanced, the dynamic balancing apparatus having means for producing two voltages FA and FB proportional to the unbalanced forces exerted upon a pair of rigidly supported spaced bearings by the rotating body to be balanced journalled thereon, said balance plane converter comprising means for receiving said voltages FA and FB for summing them to produce a voltage $(FA+FB)$, means connected to receive said voltage $(FA+FB)$ for producing a voltage $$\frac{Y}{X}(FA+FB)$$

where Y is the distance between said first balancing plane and the adjacent bearing and X is the distance between the two preselected balancing planes, means connected to receive said voltage FB for producing a voltage $$-FB\left(\frac{L}{X}\right)$$

where L is the distance between said bearings, and means connected to receive said voltages $(FA+FB)$, $$\frac{Y}{X}(FA+FB)$$

and $$-FB\left(\frac{L}{X}\right)$$

for summing them to produce said output voltage.

6. An electric balance plane converter for dynamic balancing apparatus for providing an output voltage proportional to the unbalance mass component existing within a first of two preselected balancing planes of a body to be balanced, the dynamic balancing apparatus having means for producing two voltages FA and FB proportional to the unbalanced forces exerted upon a pair of rigidly supported spaced bearings by the rotating body to be balanced journalled thereon, said balance plane converter comprising means for receiving said voltages FA and FB for summing them to produce a voltage $(FA+FB)$, means connected to receive said voltage $(FA+FB)$ for producing a voltage $$-\frac{Y}{X}(FA+FB)$$

where Y is the distance between the second balancing plane and the adjacent bearing and X is the distance between the two preselected balancing planes, means connected to receive said voltage FB for producing a voltage $$FB\left(\frac{L}{X}\right)$$

where L is the distance between said bearings, and means connected to receive said voltages $$-\frac{Y}{X}(FA+FB)$$

and $$FB\left(\frac{L}{X}\right)$$

for summing them to produce said output voltage.

7. An electric balance plane converter for dynamic balancing apparatus for providing two output voltages proportional to the unbalance mass components existing within two preselected balancing planes of a body to be balanced, the dynamic balancing apparatus having means for producing two voltages FA and FB proportional to the unbalanced forces exerted upon a pair of rigidly supported spaced bearings by the rotating body to be balanced journalled thereon, said balance plane converter comprising means for receiving said voltages FA and FB for summing them to produce a voltage $(FA+FB)$, means connected to receive said voltage $(FA+FB)$ for producing voltages $$\frac{Y}{X}(FA+FB)$$

and $$-\frac{Y}{X}(FA+FB)$$

where Y is the distance between one bearing and the adjacent one of the preselected balancing planes and X is the distance between the two preselected balancing planes, means connected to receive said voltage FB for producing voltages $$-FB\left(\frac{L}{X}\right)$$

and $$FB\left(\frac{L}{X}\right)$$

where L is the distance between said bearings, and means connected to receive said voltages $(FA+FB)$, $$\frac{Y}{X}(FA+FB)$$

and $$-FB\left(\frac{L}{X}\right)$$

for summing them to produce one said output voltage, and means connected to receive said voltages $$FB\left(\frac{L}{X}\right)$$

and $$-\frac{Y}{X}(FA+FB)$$

for summing them to produce the other said output voltage.

8. An electric balance plane converter for dynamic balancing apparatus for providing an output voltage proportional to the unbalance mass component existing within a first of two preselected balancing planes of a body to be balanced, the dynamic balancing apparatus having means for producing two voltages FA and FB proportional to the unbalanced forces exerted upon a pair of rigidly supported spaced bearings by the rotating body to be balanced journalled thereon, said balance plane converter comprising means for receiving said voltages FA and FB for summing them to produce a voltage $(FA+FB)$, means connected to receive said voltage $(FA+FB)$ for producing a voltage $$\frac{Y}{X}(FA+FB)$$

where Y is the distance between said first balancing plane and the adjacent bearing and X is the distance between the two preselected balancing planes, means connected to receive said voltage FB for producing a voltage $$-FB\left(\frac{L}{X}\right)$$

where L is the distance between said bearings, means for varying said quantities $$\frac{Y}{X} \text{ and } \frac{L}{X}$$

arbitrarily to select said balancing planes, and means connected to receive said voltages $(FA+FB)$, $$\frac{Y}{X}(FA+FB)$$

and $$-FB\left(\frac{L}{X}\right)$$

for summing them to produce said output voltage.

9. An electric balance plane converter for dynamic balancing apparatus for providing an output voltage proportional to the unbalance mass component existing within a first of two preselected balancing planes of a body to be balanced, the dynamic balancing apparatus having means for producing two voltages FA and FB proportional to the unbalanced forces exerted upon a pair of rigidly supported spaced bearings by the rotating body to be balanced journalled thereon, said balance plane converter comprising means for receiving said voltages FA and FB for summing them to produce a voltage $(FA+FB)$, means connected to receive said voltage $(FA+FB)$ for producing a voltage $$-\frac{Y}{X}(FA+FB)$$

where Y is the distance between the second balancing plane and the adjacent bearing and X is the distance between the two preselected balancing planes, means connected to receive said voltage FB for producing a voltage $$FB\left(\frac{L}{X}\right)$$

where L is the distance between said bearings, means for varying said quantities $$\frac{Y}{X} \text{ and } \frac{L}{X}$$

arbitrarily to select said balancing planes, and means connected to receive said voltages $$-\frac{Y}{X}(FA+FB)$$

and $$FB\left(\frac{L}{X}\right)$$

for summing them to produce said output voltage.

10. An electric balance plane converter for dynamic balancing apparatus for providing two output voltages proportional to the unbalance mass component existing within one of two preselected balancing planes of a body to be balanced, the dynamic balancing apparatus having means for producing two voltages FA and FB proportional to the unbalanced forces exerted upon a pair of rigidly supported spaced bearings by the rotating body to be balanced journalled thereon, said balance plane converter comprising means for receiving said voltages FA and FB for summing them to produce a voltage $(FA+FB)$, means connected to receive said voltage $(FA+FB)$ for producing voltages $$\frac{Y}{X}(FA+FB)$$

and $$-\frac{Y}{X}(FA+FB)$$

where Y is the distance between one bearing and the adjacent one of the preselected balancing planes and X is the distance between the two preselected balancing planes, means connected to receive said voltage FB for producing voltages $$-FB\left(\frac{L}{X}\right)$$

and $$FB\left(\frac{L}{X}\right)$$

where L is the distance between said bearings, means for varying said quantities $$\frac{Y}{X} \text{ and } \frac{L}{X}$$

arbitrarily to select said balancing planes, means connected to receive said voltages $(FA+FB)$, $$\frac{Y}{X}(FA+FB)$$

and $$-FB\left(\frac{L}{X}\right)$$

for summing them to produce one said output voltage, and means connected to receive said voltages $$FB\left(\frac{L}{X}\right)$$

and $$-\frac{Y}{X}(FA+FB)$$

for summing them to produce the other said output voltage.

References Cited in the file of this patent
UNITED STATES PATENTS

| Number | Name | Date |
|---|---|---|
| 2,322,561 | Bevins et al. | June 22, 1943 |
| 2,363,373 | Werner | Nov. 21, 1944 |
| 2,461,645 | Kallmann | Feb. 15, 1949 |
| 2,534,918 | Kroft et al. | Dec. 19, 1950 |
| 2,596,494 | Lynch | May 13, 1952 |
| 2,607,858 | Mason | Aug. 19, 1952 |